United States Patent
Kneidinger et al.

(10) Patent No.: US 12,384,433 B2
(45) Date of Patent: Aug. 12, 2025

(54) METHOD AND ARRANGEMENT FOR DETERMINING THE MOVEMENT STATE OF A RAIL VEHICLE WHEEL

(71) Applicant: Siemens Mobility GmbH, Munich (DE)

(72) Inventors: Bernhard Kneidinger, Göllersdorf (AT); Gerhard Schandl, Leonding (AT); Vladimir Stojanovic, Vienna (AT)

(73) Assignee: Siemens Mobility GmbH, Munich (DE)

( * ) Notice: Subject to any disclaimer, the term of this patent is extended or adjusted under 35 U.S.C. 154(b) by 94 days.

(21) Appl. No.: 18/556,717

(22) PCT Filed: Mar. 28, 2022

(86) PCT No.: PCT/EP2022/058097
§ 371 (c)(1),
(2) Date: Oct. 23, 2023

(87) PCT Pub. No.: WO2022/223241
PCT Pub. Date: Oct. 27, 2022

(65) Prior Publication Data
US 2024/0132124 A1 Apr. 25, 2024
US 2024/0227883 A9 Jul. 11, 2024

(30) Foreign Application Priority Data

Apr. 23, 2021 (DE) ...................... 10 2021 204 088.8

(51) Int. Cl.
*B61L 15/00* (2006.01)
*B60L 3/10* (2006.01)

(52) U.S. Cl.
CPC ........... *B61L 15/0081* (2013.01); *B60L 3/102* (2013.01); *B60L 2200/26* (2013.01)

(58) Field of Classification Search
CPC ...... G01P 3/36; G01P 3/38; G01P 3/68; G01P 13/00; B61K 9/00; B61K 9/12; B61L 1/00; B61L 1/163; B61L 1/166
See application file for complete search history.

(56) References Cited

U.S. PATENT DOCUMENTS

| 4,798,963 A | * | 1/1989 | Wittkopp | ................ | G01B 11/08 |
| | | | | | 250/559.22 |
| 2004/0130618 A1 | | 7/2004 | Kilian | | |

(Continued)

FOREIGN PATENT DOCUMENTS

| DE | 102018216782 A1 | 1/2020 |
| JP | S57170001 A | 10/1982 |

(Continued)

*Primary Examiner* — John Kwon
(74) *Attorney, Agent, or Firm* — Laurence A. Greenberg; Werner H. Stemer; Ralph E. Locher

(57) ABSTRACT

A method for determining the movement state of a rail vehicle wheel relative to the rail traversed by the wheel includes capturing successive images of a wheel-rail region using a camera focused on the wheel-rail region. The wheel-rail region contains at least one wheel sub-region and at least one rail sub-region traversed by the wheel. A region along which the sub-regions of the wheel and the rail contact each other is ascertained in the images. Characteristic points are ascertained in the rail and wheel sub-regions of a first image. The characteristic points are uniquely optically recognizable in the first and successive images. Respective distances from the characteristic points to the contact region are determined for successive images, and the movement state of the wheel is determined from a change in distance from the characteristic points to the contact region resulting over the successive images.

17 Claims, 7 Drawing Sheets

(56) References Cited

U.S. PATENT DOCUMENTS

2014/0333771 A1* 11/2014 Mian ................ B61L 23/041
                                                                              348/149
2023/0020727 A1* 1/2023 Dürager ............ G01N 29/043

FOREIGN PATENT DOCUMENTS

| | | |
|---|---|---|
| JP | S59175302 A | 10/1984 |
| JP | 2016097868 A | 5/2016 |
| WO | 2019117716 A1 | 6/2019 |

* cited by examiner

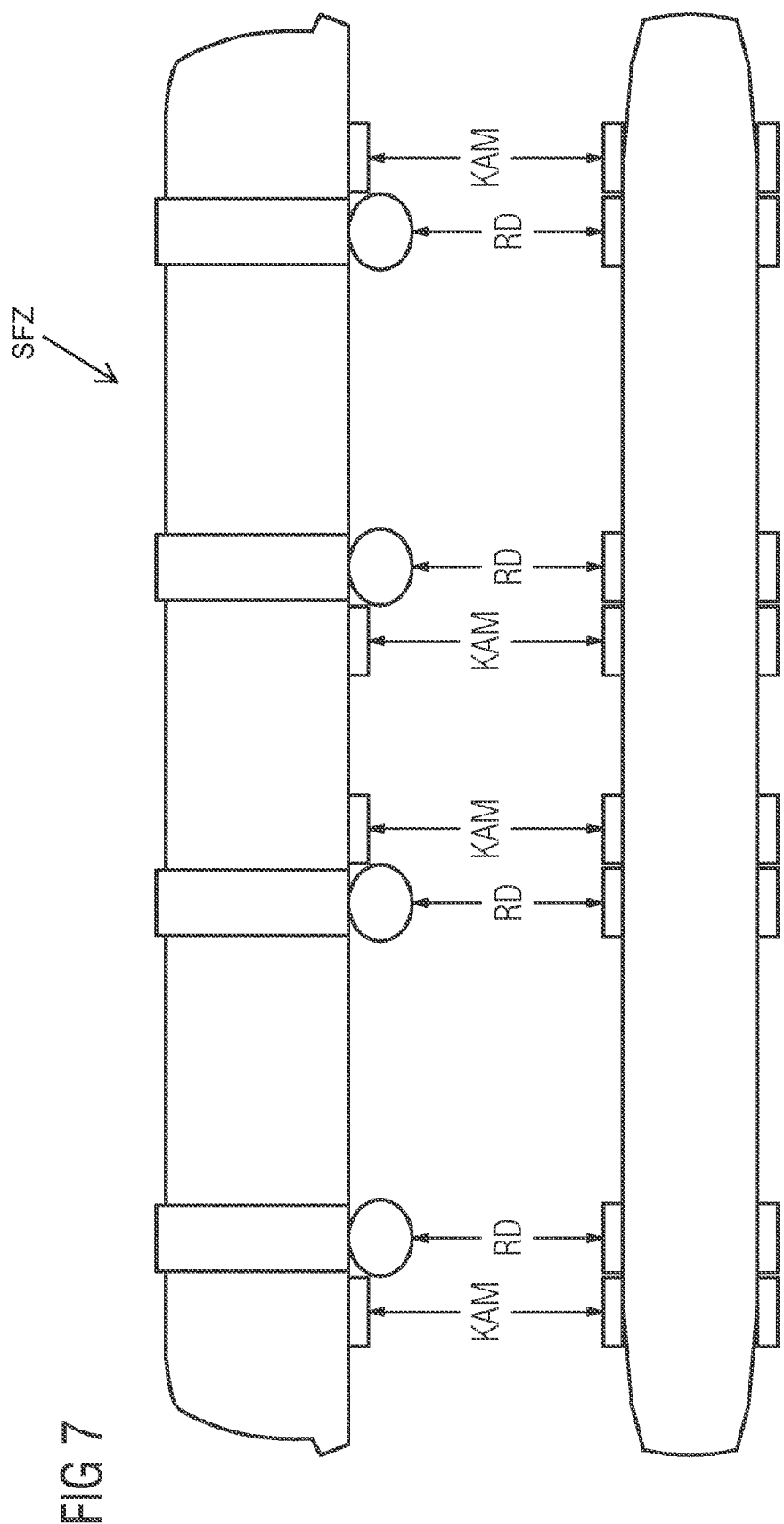

METHOD AND ARRANGEMENT FOR DETERMINING THE MOVEMENT STATE OF A RAIL VEHICLE WHEEL

FIELD AND BACKGROUND OF THE INVENTION

The invention relates to a method for determining the movement state of a wheel of a rail vehicle with respect to the rail traversed by the wheel of the rail vehicle.

In railway technology, the term "skidding" refers to the spinning of a wheel or a driven wheel on a rail. In the case of skidding, a circumferential speed of the wheel is therefore much greater than an associated travel speed of the rail vehicle.

During skidding, the coefficient of friction between the driven wheel and the rail is too low, the driven wheel spins virtually "freely", and in particular damage is caused on the rail by increased material removal.

In the case of rail vehicles, so-called anti-skid devices are provided, which are intended to prevent skidding by temporarily reducing the traction force when the rail vehicle starts in order to ensure optimized traction force transmission from the drive of the rail vehicle to the rail.

The term "sliding" refers to a rotation-free slipping of the wheel or the braked wheel on the rail. During sliding, the circumferential speed of the wheel is therefore much smaller than the associated travel speed of the rail vehicle.

During sliding, the coefficient of friction for a brake acting on the wheel is too high, the braked wheel locks up, and in particular damage is caused to the wheel by increased material removal.

In the case of rail vehicles, so-called anti-slide devices are provided which, when the rail vehicle brakes, are intended to prevent sliding of the vehicle by temporarily reducing the braking force in order to ensure optimized braking force transmission from the braking system of the rail vehicle to the rails.

The term "rolling" refers to a "normal" rotational movement of the wheel, during which the circumferential speed of the wheel corresponds at least approximately to the assigned respective travel speed of the rail vehicle during operation, when starting off and also during braking.

In summary, skidding, sliding and rolling form three movement states of the wheel of the rail vehicle.

There are various systems known for anti-skid protection or anti-slide protection, which are based on measurements of different physical variables and which use sensors for this purpose. For example, for this purpose the angular velocity of the wheel is determined by a tachogenerator or the torque of a drive is determined from measured variables of the associated current/voltage transformer.

Due to the measurement methodology described, these systems are often too slow and thus react too late to problems that arise in the drive or brakes.

SUMMARY OF THE INVENTION

It is therefore the object of the present invention to provide an improved method for determining the movement state of a wheel, which enables a responsive and reliable determination of the operating state with little additional effort.

This object is achieved by the characteristics of independent patent claims. Advantageous developments are specified in the dependent claims.

The method according to the invention is camera-based and uses well-known image processing methods or image processing algorithms.

With the method according to the invention for determining the movement state of a wheel of a rail vehicle with respect to the rail traversed by the wheel of the rail vehicle, successive images of a wheel-rail region are recorded by a camera on the rail vehicle focused on the wheel-rail region. The wheel-rail region includes at least a sub-region of a wheel of the rail vehicle and at least a sub-region of a rail to be traversed by the wheel.

In the images, a region is ascertained along which the sub-regions of the wheel and the rail are in contact.

In a first image, at least one characteristic point is ascertained for the sub-region or in the sub-region of the rail, which is clearly optically recognizable in the first image and in subsequent images. This point can be assigned to the sub-region of the rail as a component.

Accordingly, in the first image for the sub-region or in the sub-region of the wheel, at least one characteristic point is ascertained that is clearly optically recognizable in the first image and in the subsequent images. This point can be assigned to the sub-region of the wheel as a component.

For successive images, respective distances of the characteristic points from the contact region are determined. The movement state of the wheel is determined from a change in the distance of the characteristic points from the contact region that arises over the successive images.

In an advantageous development, a straight line is ascertained as a region along which the sub-regions of the wheel and the rail are in contact.

In an advantageous development, the rail head is filmed by the camera as the sub-region of the rail and/or the wheel running surface is filmed by the camera as the sub-region of the wheel.

In an advantageous development, a high-resolution camera system is used as a camera and/or a system that operates in the infrared light range or in the ultraviolet light range is used as a camera.

In an advantageous development, either rolling or sliding or skidding is determined as movement states of the wheel.

In the event that both the distance between the contact region and the characteristic point of the sub-region of the rail and the distance between the contact region and the characteristic point of the sub-region of the wheel change equally and in the same direction, "rolling" is determined as the movement state of the wheel.

In the event that the distance between the contact region and the characteristic point of the sub-region of the wheel changes, whereas the distance between the contact region and the characteristic point of the sub-region of the rail remains essentially unchanged, "skidding" is determined as the movement state of the wheel.

In the event that the distance between the contact region and the characteristic point of the sub-region of the rail changes, whereas the distance between the contact region and the characteristic point of the sub-region of the rail remains essentially unchanged, "sliding" is determined as the movement state of the wheel.

In an advantageous development, a plurality of characteristic points are used for both the sub-region of the rail and the sub-region of the wheel in order to refine the analysis of the movement state over respective changes in distance from the contact region and to initiate correspondingly finely tuned counter-adjustments for skidding or sliding of the rail vehicle.

In an advantageous development, information about the ascertained operating mode is transmitted to a drive control system of the rail vehicle and/or to a brake control system of the rail vehicle in order to initiate a respective counter-adjustment of the rail vehicle.

In an advantageous development, in the event of detected skidding on the rail vehicle, a reduction in traction force is carried out by the drive control system of the rail vehicle in order to at least counteract the skidding. Accordingly, a reduction in the traction force is carried out by the brake control system of the rail vehicle when sliding is detected on the rail vehicle in order to at least counteract the sliding.

In an advantageous development, the camera images are used for monitoring and/or assessing a rail condition of a railway line.

In an advantageous development, damage, surface changes, surface discoloration and/or structures on the sub-region of the rail or the wheel are used as characteristic points.

In an advantageous development, markings applied to the sub-region of the rail or to the sub-region of the wheel are used as characteristic points.

The method according to the invention makes it possible to determine both the skidding and the sliding of a driven or braked wheel very quickly, reliably and precisely.

The method according to the invention makes it possible to reduce or to completely prevent wear on the wheel, more precisely on the wheel running surface, as well as on the rail, more precisely on the rail head.

The method according to the invention enables improvement or optimization of a drive control system or a brake control system that acts upon the rail vehicle during operation.

The method according to the invention enables a current or a subsequent visualization and evaluation of wheel movement states along a rail or railway line as well as an evaluation of the condition of the track.

The method according to the invention saves previously necessary operating resources, such as sand or compressed air of a start-up auxiliary device of the rail vehicle. This also supports or enables environmentally friendly operation of the rail vehicle.

The method according to the invention can be used reliably regardless of the time of day and even in bad weather conditions.

This is achieved, for example, by a suitable choice of the camera system used (e.g. through its resolution) and the wavelength range (infrared light, ultraviolet light) in which the camera system operates that is used for observation.

The method according to the invention prolongs maintenance intervals for a reprofiling of the wheel discs. At the same time, the wear and tear on the infrastructure is reduced, especially in stations and on track inclines.

The invention is explained below in more detail on the basis of a drawing.

BRIEF DESCRIPTION OF THE FIGURES

FIG. 7 shows a rail vehicle with an arrangement of the cameras for the method according to the invention.

DETAILED DESCRIPTION OF THE INVENTION

Figure 1:
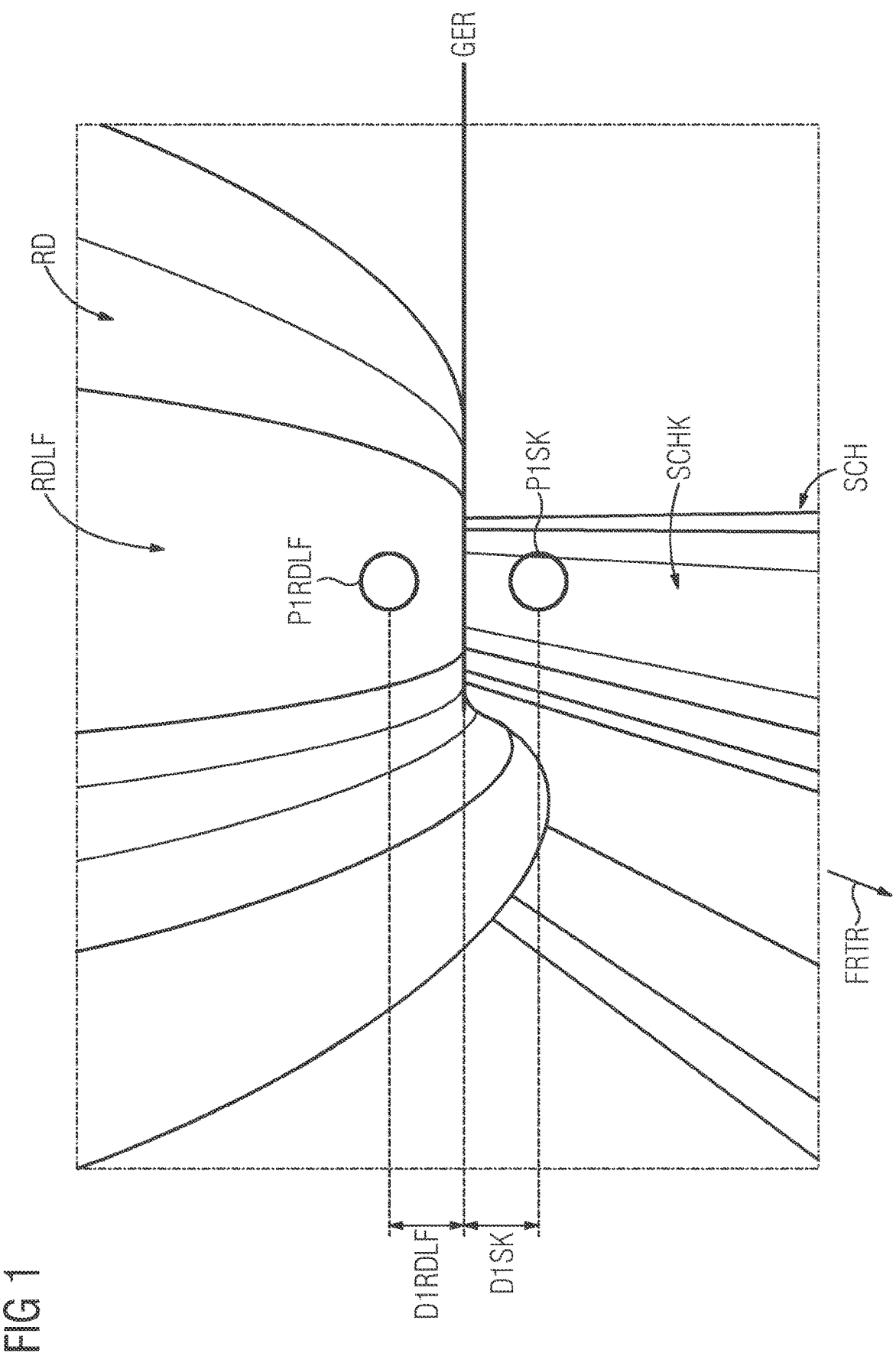
FIG. 1 shows the inventive working principle according to the invention in an overview.

FIG. 1 shows the inventive working principle according to the invention in an overview.

A rail vehicle is equipped with a camera, preferably a high-resolution camera, which is directed towards or focused on a wheel-rail region.

In this region, at least a sub-region of a wheel RD of the rail vehicle as well as at least a sub-region of a rail SCH to be traversed by the wheel can be seen.

Preferably, the camera captures a wheel running surface RDLF as a sub-region of the wheel RD in successive images, while a rail head SCHK is captured as a sub-region of the rail SCH.

In successive images of the camera, a straight line between the rail head SCHK and the wheel running surface RDLF along which the two are in contact is ascertained by means of camera electronics or evaluation electronics.

In successive images of the camera, a characteristic point P1SK on the rail head SCHK is ascertained using the evaluation electronics. correspondingly, a characteristic point P1RDLF is ascertained on the wheel running surface RDLF.

Optically recognizable and unambiguously assignable points are used as characteristic points P1SK, P1RDLF. For example, these are recognizable damage, surface changes, surface discoloration, etc., on the rail head SCHK or on the wheel running surface RDLF.

Alternatively or in addition to this, specially provided markings are used as characteristic points, which are applied to the rail head SCHK or to the wheel running surface RDLF.

In successive images of the camera, using the evaluation electronics a distance D1SK is ascertained between the characteristic point P1SK and the straight line GER. Correspondingly, a distance D1RDLF is ascertained between the characteristic point P1RDLF and the straight line GER.

These distances D1SK, D1RDLF change depending on the movement state of the wheel RD of the rail vehicle.

When the wheel is moving in the direction of travel FRTR
  during rolling, the two distances D1SK, D1RDLF will decrease equally,
  during skidding (i.e. when the wheel RD is spinning), the distance D1RDLF will decrease, whereas the distance D1SK will remain essentially the same, and
  during sliding (i.e. when the wheel RD is locked), the distance D1RDLF will remain essentially the same, whereas the distance D1SK will decrease.

By analyzing the successive images, the movement state of the wheel RD of the rail vehicle is thus inferred or ascertained.

The aforementioned study and evaluation of the distance change are carried out within specified tolerances, so that rather minor deviations in the distance changes occurring during the operational operation of the rail vehicle do not distort the evaluation result.

Figure 2:
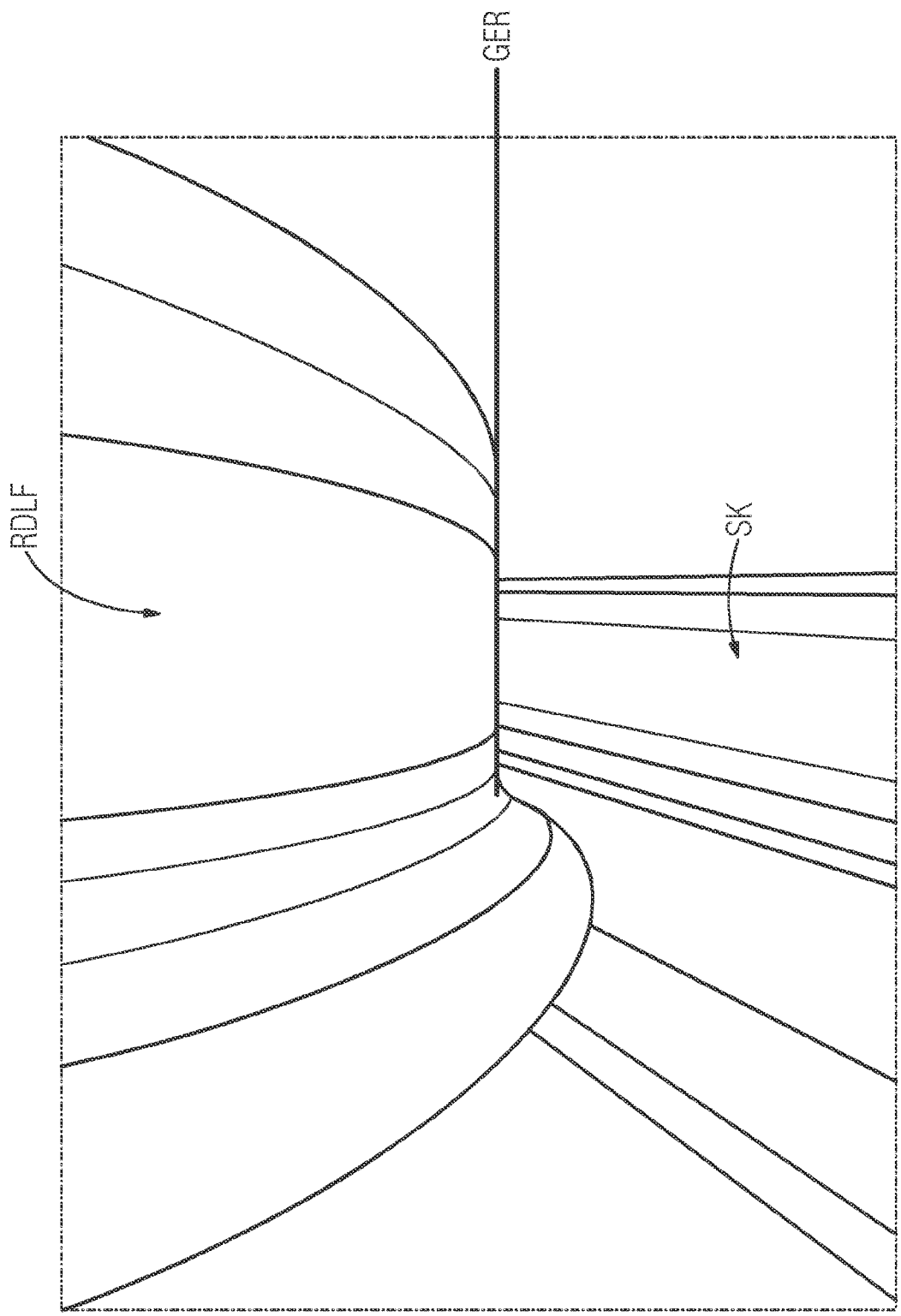
FIG. 2 shows, with reference to FIG. 1, a contour extraction for determining a straight line.

With reference to FIG. 1, FIG. 2 shows a contour extraction, the result of which is the straight line GER between the wheel running surface RDLF and the rail head SK.

Figure 3:
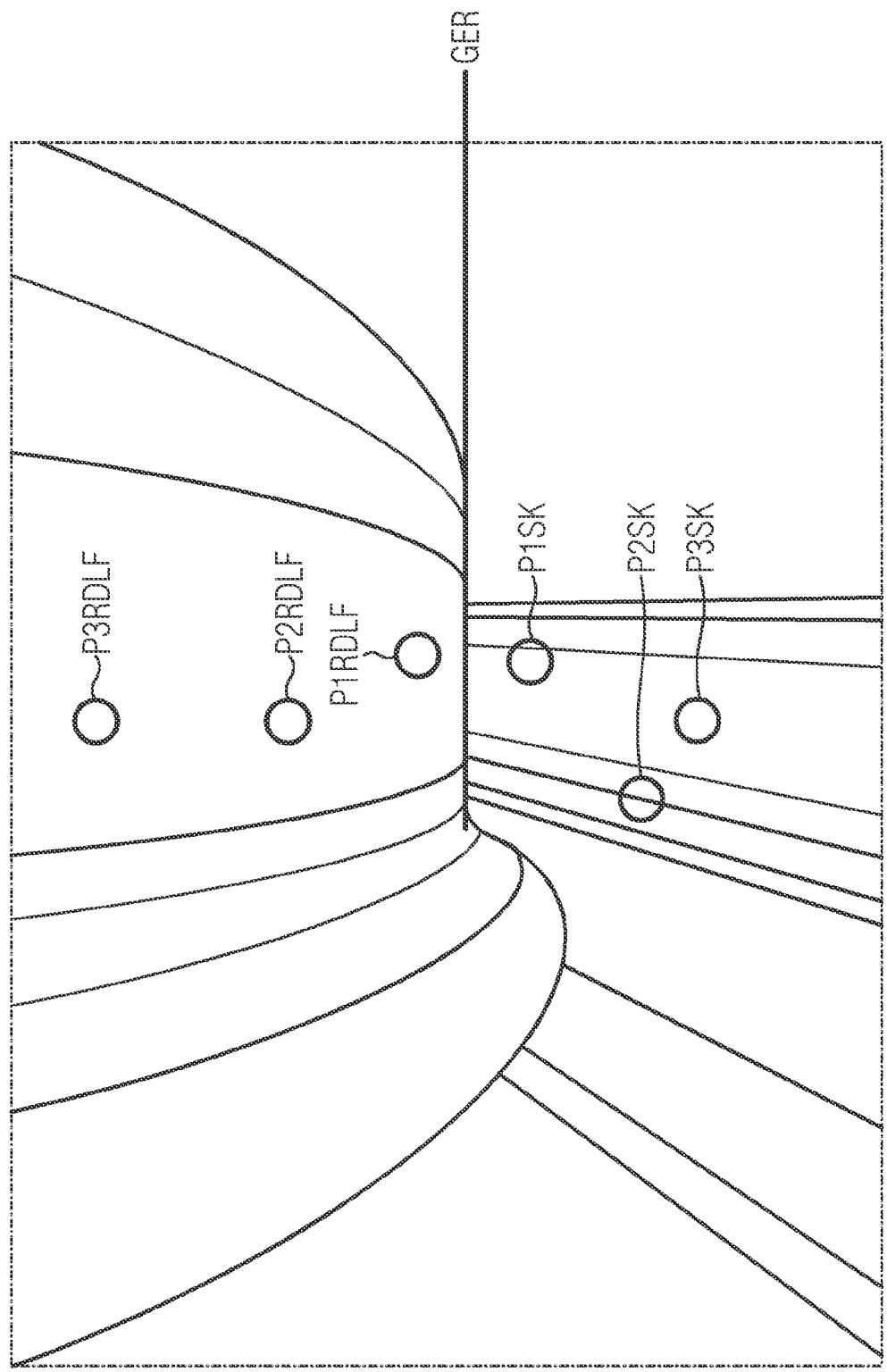
FIG. 3 shows, with reference to FIG. 1 and FIG. 2, a determination of characteristic points.

With reference to the figures FIG. 1, FIG. 2, FIG. 3 shows a determination or an extraction of characteristic points P1SK, P2SK, P3SK as well as P1RDLF, P2RDLF, P3RDLF.

Figure 4:
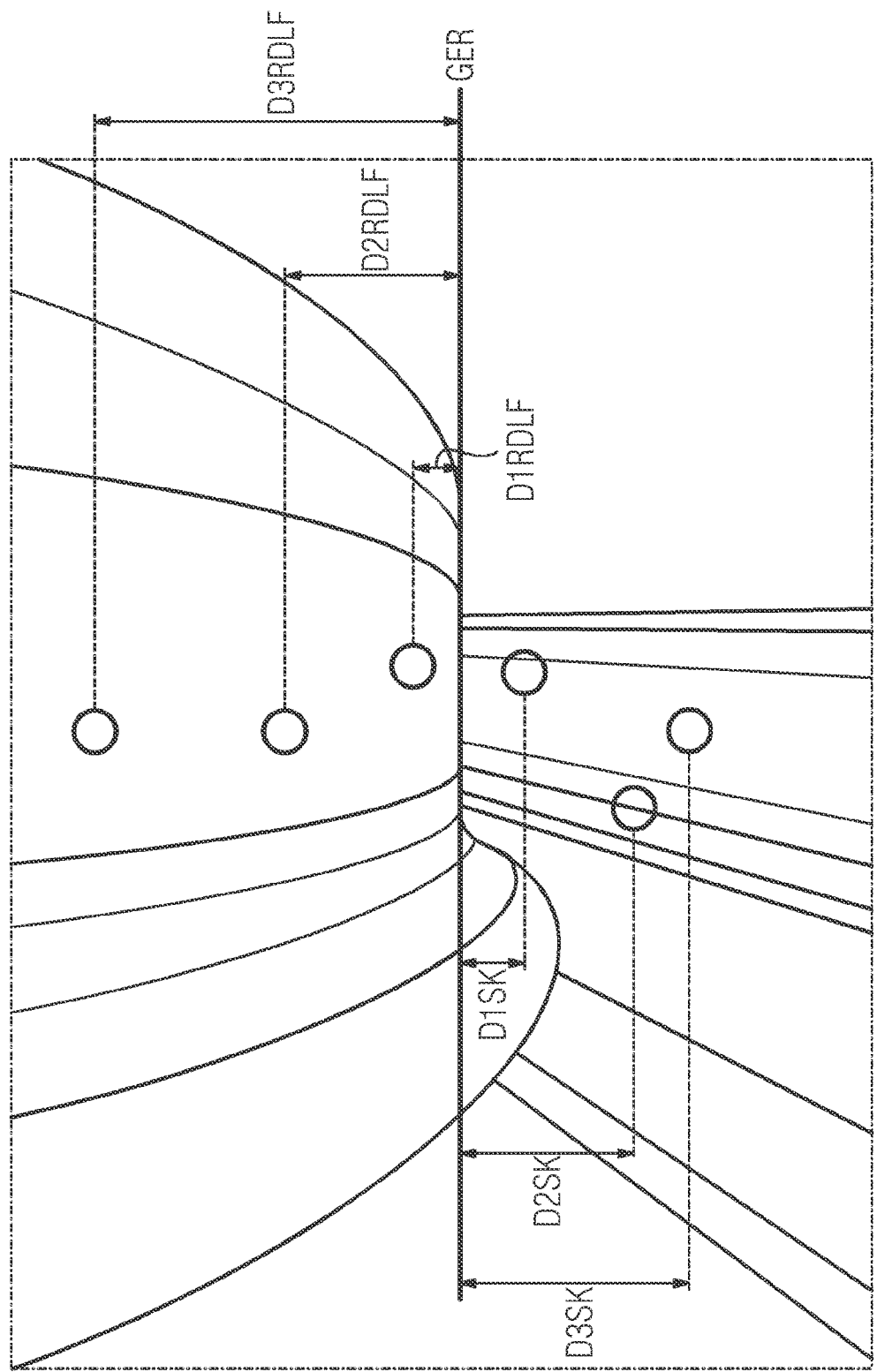
FIG. 4 shows, with reference to FIG. 3, a determination of distances of the characteristic points from the straight line.

With reference to FIG. 3, FIG. 4 shows the distances D1SK, D2SK, D3SK assigned to the characteristic points P1SK, P2SK, P3SK and P1RDLF, P2RDLF, P3RDLF as well as D1RDLF, D2RDLF, D3RDLF assigned to the straight line GER.

Through the use of a plurality of characteristic points shown in FIG. 3 and FIG. 4 and the associated analysis of the corresponding distance changes, the analysis of the movement state is refined and more precise results are ascertained for the magnitude of the skidding or sliding.

This will ensure a correspondingly finely tuned counter-adjustment in order to reduce or completely prevent skidding or sliding.

Figure 5:
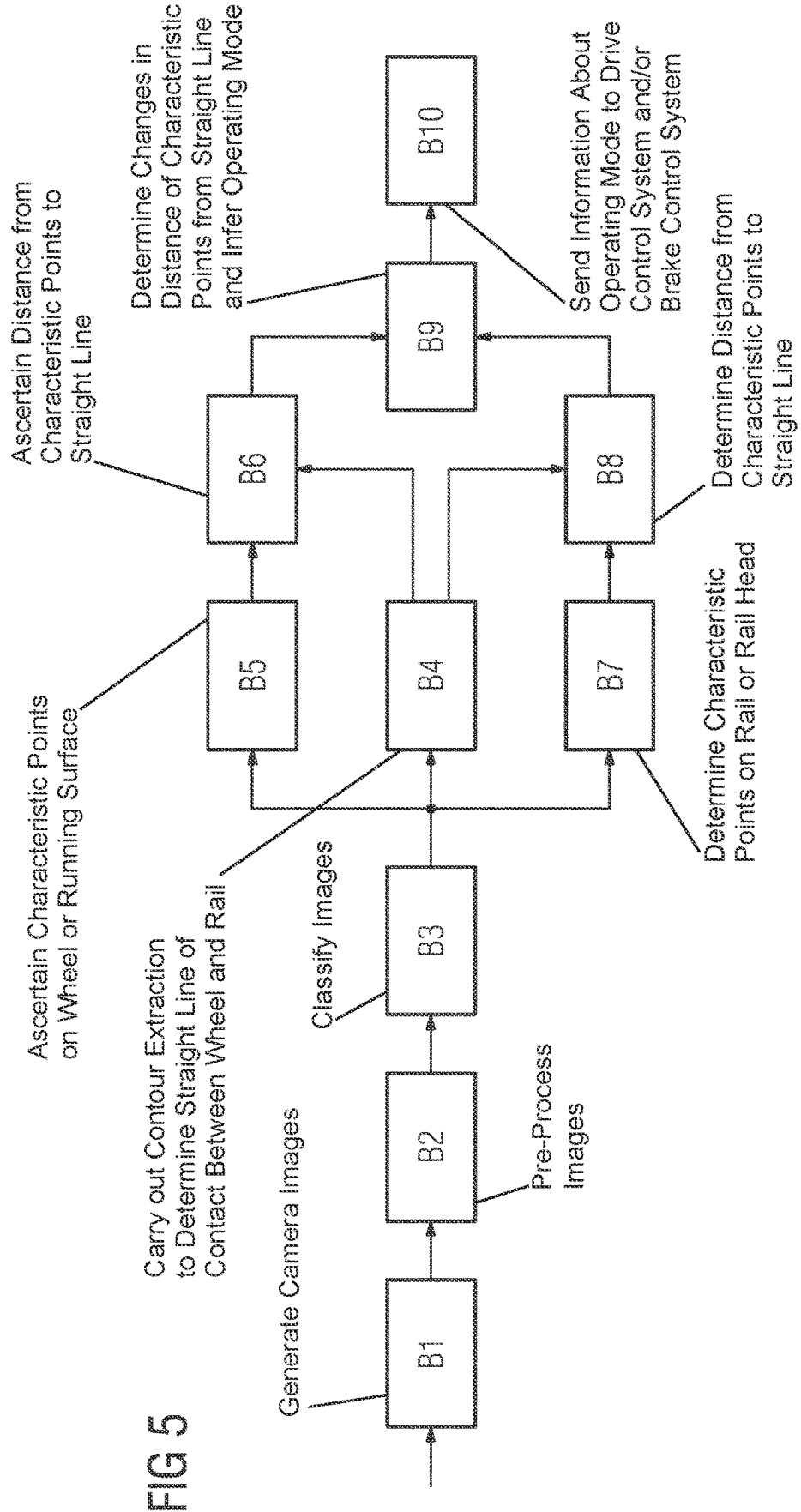
FIG. 5 shows, with reference to the preceding figures, the method according to the invention in a flow chart.

With reference to the preceding figures, FIG. 5 shows the method according to the invention in a flow chart or on the basis of an associated software architecture.

In a first block B1, a high-resolution camera is used to generate successive camera images in which the wheel-rail region can be seen.

These images are pre-processed in a second block B2 and classified in a third block B3, i.e. assigned to a respective monitored wheel of the rail vehicle.

In a fourth block, B4, a contour extraction is carried out in order to determine the straight line along which the wheel (wheel running surface) and the rail (rail head) are in contact.

In a fifth block B5, one or more characteristic points on the wheel or wheel running surface are extracted or ascertained.

In a sixth block B6, the distance of the characteristic points of the wheel or the wheel running surface from the straight line is ascertained.

In a seventh block B7, one or more characteristic points on the rail or rail head are extracted or determined.

In an eighth block B8, the distance of the characteristic points of the rail or rail head from the straight line is determined.

In a ninth block B9, the changes in distance of the respective characteristic points from the straight line are determined and an operating mode of the wheel is inferred.

In a tenth block B10, information about the ascertained operating mode is sent to a drive control system of the rail vehicle and/or to a brake control system of the rail vehicle.

In the event of detected skidding of the wheel, a time limited reduction in the traction force of the rail vehicle is initiated by the drive control in order to reduce or prevent skidding.

In the event of detected sliding of the wheel, a time limited reduction in the braking force of the rail vehicle is initiated by the drive control system in order to reduce or prevent the skidding.

Figure 6:
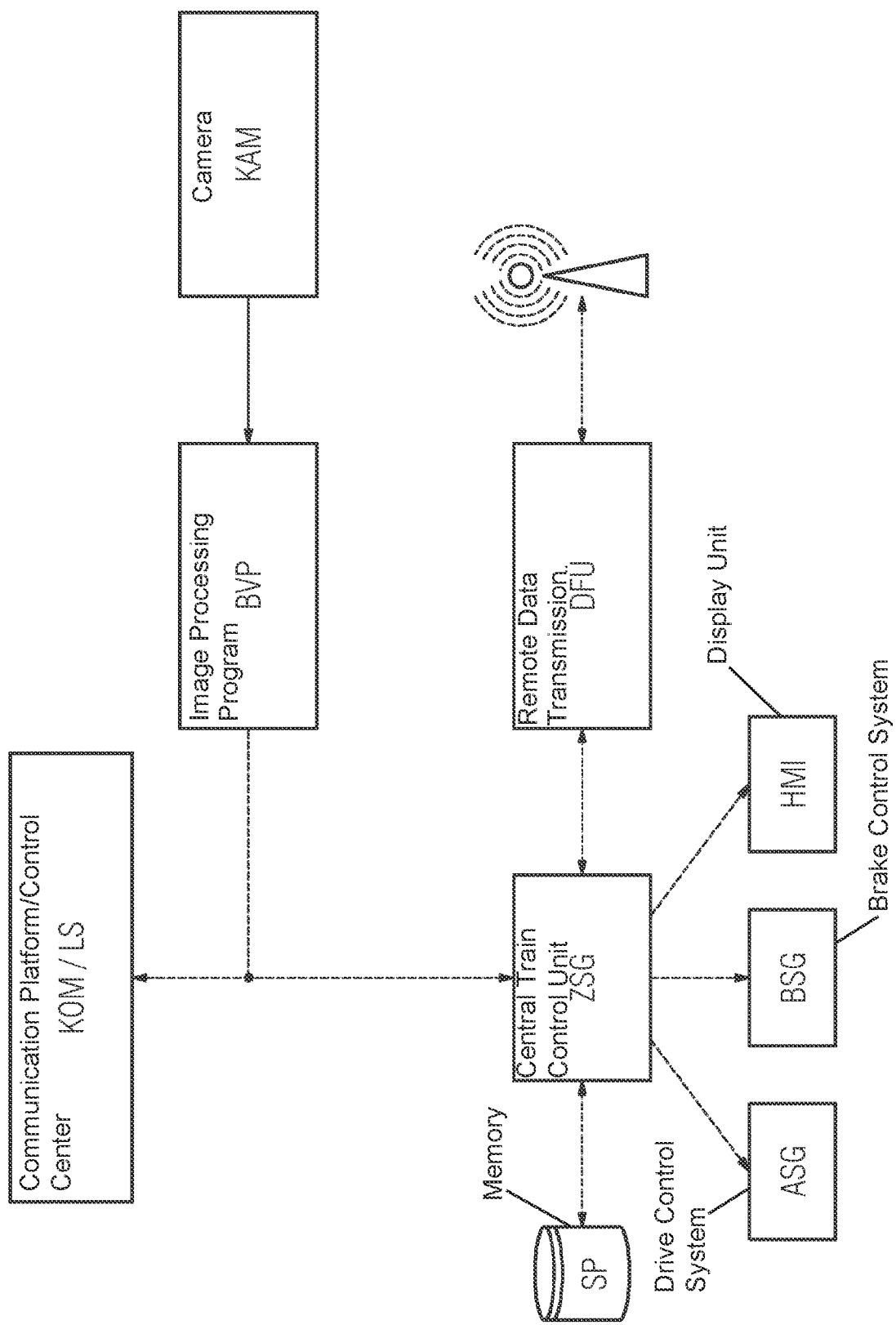
FIG. 6 shows, in a schematic diagram, the use of the camera images taken in the context of the invention.

FIG. 6 shows the use of the camera images taken as part of the invention in a schematic diagram.

The high-resolution images generated using the camera KAM are sent to an image processing program BVP, where they are analyzed and the operating mode of the wheel is ascertained.

In a preferred development, the image processing program BVP is used to ascertain or detect the condition of the rails from the images.

The camera images, the operating mode and/or the rail status information are preferably sent to a land-based control centre LS or a communication platform KOM, for example a RAILIGENT platform, for further processing.

In a preferred development, the camera images, the operating mode and/or the rail condition information are fed to a central train control unit ZSG of the rail vehicle.

In a preferred development, the central train control unit ZSG initiates radio-controlled transfer by a remote data transmission DFU of the rail vehicle for further processing.

In a preferred development, the central train control unit ZSG initiates documentation by means of a memory SP of the rail vehicle.

In a preferred development, the central train control unit ZSG initiates the aforementioned countermeasures to counteract skidding or sliding by means of a drive control system ASG or a brake control system BSG.

In a preferred development, the central train control unit ZSG provides information to the driver of the rail vehicle by means of a display unit HMI.

This information preferably relates to the ascertained operating mode of the wheel and/or appropriate countermeasures to be initiated by the locomotive driver.

In a preferred development, this information contains a communication about the countermeasures that have been automatically taken and have already been carried out in order to inform the locomotive driver of the drive or braking situation.

FIG. 7 shows a rail vehicle SFZ for the method according to the invention as well as an advantageous arrangement of the cameras KAM used in the method according to the invention, which, as shown here, are individually arranged for each individual wheel RD.

The invention claimed is:

1. A method for determining a movement state of a wheel of a rail vehicle relative to a rail traversed by the wheel of the rail vehicle, the method comprising:
    using a camera focused on a wheel-rail region on the rail vehicle to capture successive images of the wheel-rail region, the wheel-rail region containing at least a sub-region of a wheel of the rail vehicle and at least a sub-region of a rail to be traversed by the wheel;
    ascertaining a region in the images along which the sub-regions of the wheel and the rail are in contact;
    in a first image of the sub-region of the rail, ascertaining at least a characteristic point being clearly optically recognizable in the first image and in subsequent images;
    in a first image of the sub-region of the wheel, ascertaining at least one characteristic point being clearly recognizable in the first image and in the subsequent images;
    determining respective distances of the characteristic points from the contact region for successive images;
    determining a movement state of the wheel from a change in the distance of the characteristic points from the contact region, resulting from the successive images; and
    performing at least one determining step selected from the group consisting of:
        group 1) determining rolling as the movement state of the wheel when both: the distance between the contact region and the characteristic point of the sub-region of the rail, and the distance between the contact region and the characteristic point of the sub-region of the wheel, change equally and in the same direction;
        group 2) determining skidding as the movement state of the wheel when: the distance between the contact region and the characteristic point of the sub-region of the wheel changes, and the distance between the contact region and the characteristic point of the sub-region of the rail remains substantially unchanged; and group 3) determining sliding as the movement state of the wheel when: the distance between the contact region and the characteristic point of the sub-region of the rail changes, and the distance between the contact region and the characteristic point of the sub-region of the wheel remains substantially unchanged.

2. The method according to claim 1, which further comprises ascertaining a straight line as the region along which the sub-regions of the wheel and the rail are in contact.

3. The method according to claim 1, which further comprises using the camera to capture at least one of:
   a rail head of the rail as the sub-region of the rail, or
   a wheel running surface of the wheel as the sub-region of the wheel.

4. The method according to claim 1, which further comprises at least one of:
   using a high-resolution camera system as the camera, or
   using a system operating in the infrared light range or in the ultraviolet light range as the camera.

5. The method according to claim 1, which further comprises determining the rolling as the movement state of the wheel.

6. The method according to claim 1, which further comprises determining the skidding as the movement state of the wheel.

7. The method according to claim 1, which further comprises determining the sliding as the movement state of the wheel.

8. The method according to claim 1, which further comprises using a plurality of characteristic points for both the sub-region of the rail and the sub-region of the wheel to refine an analysis of the movement state over respective changes in distance from the contact region and to initiate correspondingly finely tuned counter-adjustments for skidding or sliding of the rail vehicle.

9. The method according to claim 1, which further comprises transmitting information about an ascertained operating mode to at least one of a drive control system of the rail vehicle or a brake control system of the rail vehicle, in order to initiate a corresponding counter-adjustment of the rail vehicle.

10. The method according to claim 9, which further comprises:
   using the drive control system of the rail vehicle to carry out a traction force reduction when skidding is detected on the rail vehicle in order to at least counteract the skidding, or
   using the brake control system of the rail vehicle to carry out a traction force reduction when sliding is detected on the rail vehicle in order to at least counteract the sliding.

11. The method according to claim 1, which further comprises using the camera images for at least one of monitoring or assessing a rail condition of a railway line.

12. The method according to claim 1, which further comprises using, as the characteristic points, at least one of feature selected from the group consisting of: damage of the rail, surface changes of the rail, surface discoloration of the rail, structures on the sub-region of the rail, damage of the wheel, surface changes of the wheel, surface discoloration of the wheel, and structures on the sub-region of the wheel.

13. An arrangement for determining a movement state of a wheel of a rail vehicle, the arrangement comprising:

a rail vehicle having a wheel;
a rail to be traversed by said wheel of said rail vehicle;
said wheel of said rail vehicle and said rail defining a wheel-rail region containing at least one sub-region of said wheel of said rail vehicle and at least one sub-region of said rail to be traversed by said wheel;
a camera disposed on said rail vehicle and focused on said wheel-rail region, said camera configured to record successive images of said wheel-rail region; and
means for carrying out image analysis to perform the method according to claim 1.

14. The method according to claim 1, which further comprises using, as the characteristic points, at least one of feature selected from the group consisting of: markings attached to the sub-region of the rail, and markings attached to the sub-region of the wheel.

15. A method for determining a movement state of a wheel of a rail vehicle relative to a rail traversed by the wheel of the rail vehicle, the method comprising:
   using a camera focused on a wheel-rail region on the rail vehicle to capture successive images of the wheel-rail region, the wheel-rail region containing at least a sub-region of a wheel of the rail vehicle and at least a sub-region of a rail to be traversed by the wheel;
   ascertaining a region in the images along which the sub-regions of the wheel and the rail are in contact;
   in a first image of the sub-region of the rail, ascertaining at least a characteristic point being clearly optically recognizable in the first image and in subsequent images;
   in a first image of the sub-region of the wheel, ascertaining at least one characteristic point being clearly recognizable in the first image and in the subsequent images;
   determining respective distances of the characteristic points from the contact region for successive images;
   determining a movement state of the wheel from a change in the distance of the characteristic points from the contact region, resulting from the successive images;
   transmitting information about an ascertained operating mode to at least one of a drive control system of the rail vehicle or a brake control system of the rail vehicle, in order to initiate a corresponding counter-adjustment of the rail vehicle; and
   using the drive control system of the rail vehicle to carry out a traction force reduction when skidding is detected on the rail vehicle in order to at least counteract the skidding, or using the brake control system of the rail vehicle to carry out a traction force reduction when sliding is detected on the rail vehicle in order to at least counteract the sliding.

16. A method for determining a movement state of a wheel of a rail vehicle relative to a rail traversed by the wheel of the rail vehicle, the method comprising:
   using a camera focused on a wheel-rail region on the rail vehicle to capture successive images of the wheel-rail region, the wheel-rail region containing at least a sub-region of a wheel of the rail vehicle and at least a sub-region of a rail to be traversed by the wheel;
   ascertaining a region in the images along which the sub-regions of the wheel and the rail are in contact;
   in a first image of the sub-region of the rail, ascertaining at least a characteristic point being clearly optically recognizable in the first image and in subsequent images;

in a first image of the sub-region of the wheel, ascertaining at least one characteristic point being clearly recognizable in the first image and in the subsequent images;
determining respective distances of the characteristic points from the contact region for successive images;
determining a movement state of the wheel from a change in the distance of the characteristic points from the contact region, resulting from the successive images; and
determining rolling, sliding, or skidding as the movement state of the wheel.

17. The method according to claim 16, which further comprises determining sliding or skidding as the movement state of the wheel.

* * * * *